(12) United States Patent
Tang et al.

(10) Patent No.: US 9,626,638 B2
(45) Date of Patent: Apr. 18, 2017

(54) METHOD AND DEVICE FOR ASSIGNING SURPLUS SLABS IN THE SLAB YARD BEFORE HOT ROLLING PROCESS

(71) Applicant: NORTHEASTERN UNIVERSITY, Shenyang (CN)

(72) Inventors: Lixin Tang, Shenyang (CN); Ying Meng, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 0 days.

(21) Appl. No.: 14/810,343

(22) Filed: Jul. 27, 2015

(65) Prior Publication Data
US 2015/0332194 A1     Nov. 19, 2015

Related U.S. Application Data

(63) Continuation-in-part of application No. 13/679,954, filed on Nov. 16, 2012, now abandoned.

(30) Foreign Application Priority Data

Mar. 19, 2012 (CN) .......................... 2012 1 0073591

(51) Int. Cl.
*G06Q 10/00* (2012.01)
*G06Q 10/06* (2012.01)
(Continued)

(52) U.S. Cl.
CPC ....... *G06Q 10/06315* (2013.01); *B21B 1/026* (2013.01); *B21B 45/004* (2013.01); *G06Q 10/067* (2013.01); *G06Q 10/0631* (2013.01)

(58) Field of Classification Search
CPC .................... G06Q 10/06315; G06Q 10/0631
(Continued)

(56) References Cited

U.S. PATENT DOCUMENTS 6,044,361 A * 3/2000 Kalagnanam et al. ......... 705/28
6,321,132 B1    11/2001 Dawande et al.
(Continued)

FOREIGN PATENT DOCUMENTS

CN        1661609 A     8/2005
CN     102034155 A     4/2011

OTHER PUBLICATIONS

Lixin Tang and Xianpeng Wang, "A predictive reactive scheduling method for color-coating production in steel industry", Int J Adv Manuf Technol (2008) 35:633-645.*

(Continued)

*Primary Examiner* — Jonathan G Sterrett
*Assistant Examiner* — Mehmet Yesildag

(57) ABSTRACT

A method for assigning surplus slabs in slab yards to orders includes loading slab pre-yards of a plurality of production lines with surplus slabs, describing the assignment of the surplus slabs to the orders with a mathematical model, grouping order data and slab data based on steel grades, obtaining an assignment scheme for the surplus slabs and the orders in each group with a mixed scatter search algorithm, and assigning the surplus slabs to the orders using the assignment scheme. If a surplus slab is in a pre-yard of a production line associated with an order the surplus slab is assigned to, the slab is moved using a crane to the production line. Otherwise, the slab is moved to the pre-yard associated with the production line, and then moved using a crane to the production line. The slab is then heated and rolled by the production line.

10 Claims, 3 Drawing Sheets

(51) Int. Cl.
    *B21B 1/02*     (2006.01)
    *B21B 45/00*     (2006.01)

(58) Field of Classification Search
    USPC .............................................. 705/7.12, 7.24
    See application file for complete search history.

(56) References Cited

U.S. PATENT DOCUMENTS

2006/0100727 A1*   5/2006   Dash ............... G05B 19/41865
                                                               700/97
2013/0268249 A1*  10/2013   Tang ...................... G06F 17/50
                                                                703/2

OTHER PUBLICATIONS

Lixin Tang and Xianpeng Wang, "A Scatter Search Algorithm for a Multistage Production Scheduling Problem With Blocking and Semi-Continuous Batching Machine", IEEE Transactions on Control Systems Technology, vol. 19, No. 5, Sep. 2011.*
Notice of Allowance for Chinese Patent Application No. 201210073591.6, dated Jan. 25, 2016.
Chinese Office Action for Application No. 201210073591.6 of Jul. 16, 2015.
Chinese Office Action for Application No. CN 201210073591.6 dated Mar. 3, 2015.

* cited by examiner

METHOD AND DEVICE FOR ASSIGNING SURPLUS SLABS IN THE SLAB YARD BEFORE HOT ROLLING PROCESS

CROSS REFERENCE TO RELATED APPLICATIONS

The present application is a continuation in part of U.S. patent application Ser. No. 13/679,954 filed on Nov. 16, 2012, which claims priority to Chinese Patent Application No. 201210073591.6, filed on Mar. 19, 2012, the disclosures of which are hereby incorporated in their entirety by reference.

FIELD OF THE INVENTION

The present invention relates to the field of information technology, more particularly, to a method and a device for assigning surplus slabs in the slab yard to orders before hot rolling process in an iron and steel enterprise.

BACKGROUND

The iron and steel industry, belonging to raw material industry, is a fundamental industry for national economy and plays an important role in the social development. Presently, demands of iron and steel market tend to be complicated, of multi-variety and small-batch, which has an increasing collision with traditional volume production of the iron and steel industry, hence leading to frequent occurrences of production output exceeding order quantity during production process of iron and steel enterprises.

Generally speaking, after the production processes of steel making and continuous casting, surplus slabs exceeding customer's order demand will be stored in the slab yard before hot rolling process as a surplus inventory. Upon investigation, in iron and steel enterprises, surplus inventory accounts for ¼ of total inventory of the slab yard before hot rolling process. The generation of surplus inventory greatly increases production costs, occupies production funds and degrades effective utilization of resources.

Since different kinds of iron and steel products may be obtained by processing the same slab via different technology routing, a solution to the above problem is to match surplus inventory to customer's order before the hot rolling process, namely, assigning surplus slabs to orders with owed quantity in the hot rolling plan.

Presently, surplus slabs assigning in iron and steel enterprises is made manually. Various assigning constraints are involved in the assignment, including steel grades, width, length, weight and due dates specified in orders. Since there are a large number of surplus slabs and orders, manual approach cannot consider various assigning constraints in a comprehensive and accurate manner, which tends to result in unreasonable assignment, leading to high cut-loss of slabs, high inventory costs, low ratio (i.e. hot-charged ratio) of slabs that are loaded into reheating furnace with a higher temperature, assigning the slabs with higher steel grade to orders with low steel grade requirement, hence wasting production resources and energy and increasing comprehensive production costs. Therefore, how to make reasonable utilization of surplus slabs has become a critical technology problem for iron and steel enterprises.

Some domestic and abroad literatures have reported the relevant researches on this kind of problem. Vasko etc. have studied the slab matching problem in which a slab may be divided into two pieces for matching respectively (see, F. J. Vasko, M. L. Cregger, K. L. Stott, L. R. Woodyatt, "Assigning slabs to orders: An example of appropriate model formulation", Computers & Industrial Engineering, 1994, 26:797-800). An integer planning model is formulated based on discrete feature of the problem. This problem is converted to a transportation problem by adding virtual orders and virtual slabs to be solved with the Bertsekas' network node method.

Dawande etc. also studied the issue of matching slabs and orders with the objectives of minimizing the number of assigned slabs and minimizing cut-loss of slab, in which a slab may be cut into several pieces. (see, M. Sawande, J. Kalagnanam, H. S. Lee, C. Reddy, S. Siegel, M. Trumbo, "The Slab-Design Problem in The Steel Industry", Interfaces, 2004, 34-215-225). A heuristic algorithm is designed for solving this problem.

In both of the above-mentioned solutions, a surplus slab may be cut into multiple pieces to be assigned to multiple orders. However, a many-to-one optimized matching between surplus slabs and orders is not addressed.

SUMMARY

In view of the above problems, an object of the present invention is to provide a method and a device for assigning surplus slabs the slab pre-yard to orders before hot rolling process and hence reduce surplus inventory, increase number of orders without owed quantity, reduce slab cut-loss and thermal loss and increase profit of enterprise.

Generally, slabs are rolled on each of a plurality of production lines in accordance with respective orders. An order specifies steel grades, width, length, weight and due dates of required slabs, and it also specifies a production line to roll the slabs in accordance with the said order. The slabs are distributed to a plurality of production lines for rolling, each of the production lines includes, a reheating furnace, a rolling mill, and each production line is associated with a slab pre-yard to store slabs to be rolled on the production line. The slabs are first moved to the respective slab pre-yard of each production line.

Each order specifies a production line, on which the order is to be implemented, and steel slabs, which have been assigned to an order, are moved to the slab pre-yard of a production line that the order specifies. According to an aspect of the present invention, the method for assigning surplus slabs in the slab pre-yard before hot rolling process includes steps of:

S50: loading each of slab pre-yards of a plurality of production lines with slabs for rolling;

S100: quantitatively describing assignment of surplus slabs in the slab yard to orders before hot rolling process with a mathematical model, said quantitative description comprises choosing decision variables, setting optimization objectives and constraints on assignments of surplus slabs;

S200: setting parameters of the mathematical model used in step S100;

S300: grouping order data and slab data based on steel grades, each group including slabs with a same steel grade and orders matching the steel grade of slabs in the group, so that no slab in one group is assigned to an order of another group;

S400: obtaining an assignment scheme for surplus slabs and orders in each group with a mixed scatter search algorithm;

S500: assigning said surplus slabs in the slab yard to orders before hot rolling process by using said assignment scheme;

S600: judging whether each of the slabs, which has been assigned to an order, was loaded to a slab pre-yard of a production line which the order specifies;

S700: if it is determined in step S600 that, the slab stays in a slab pre-yard of a production line which the order specifies, then moving the slab with a crane to the production line for rolling;

S800: if it is determined in step S600 that, the slab is not staying in a slab pre-yard of a production line which the order specifies, then moving the slab with a transport unit, such as a truck, to the production line to which the order specifies, and then moving the slab with a crane from the slab pre-yard to the production line for rolling;

S900: heating the slab with a reheating furnace and rolling the slab with a roller of the production line according to the order to which the slab is assigned to.

wherein, the mixed scatter search algorithm used in the step S400 further comprises steps of:

S401: initializing parameters of the algorithm, setting the value of PSize which is the size of initial population consisted of assignment schemes, the value of MaxIter which is the maximum number of iterations, the value of $b_1$ which is the number of assignment schemes with good qualities in a reference set, and the value of $b_2$ which is the number of assignment schemes with good dispersity in the reference set, setting the update mark of the reference set NewElements=FALSE, setting the reading of iterations counter Iter=0 and candidate scheme set AlterSet=$\Phi$;

S402: constructing initial population of assignment schemes with heuristics methods and a randomization strategy respectively;

S403: constructing the assignment scheme reference set Refset based on the initial population of assignment schemes, namely Refset=$\{x_1, \ldots, x_{b_1}, x_{b_1+1}, \ldots, x_{b_1+b_2}\}$, and setting NewElements=TRUE;

S404: setting the reading of the iterations counter Iter=Iter+1. If Iter>MaxIter or NewElements=FALSE, then proceeding to step S410; otherwise, constructing a scheme subset NewSubsets based on assignment schemes in Refset;

S405: choosing an assignment scheme subset s in NewSubsets, and combining assignment schemes in the assignment scheme subset s with a scheme combination method to generate a new assignment scheme $x_{new}$;

S406: improving the new assignment scheme $x_{new}$ with a variable depth search strategy to get an improved assignment scheme x';

S407: if the assignment scheme x' does not exist in the reference set Refset or the candidate set AlterSet, and the objective function value of assignment scheme x' is smaller than the objective function value of any assignment scheme in the reference set Refset, then putting said improved assignment scheme x' into the scheme candidate set AlterSet;

S408: deleting the subset s from NewSubsets, if NewSubsets is empty, then proceeding to step S409; otherwise, executing step S405; S409: updating the reference set Refset, if the reference set is updated, letting NewElements=TRUE; otherwise, NewElements=FALSE, and carrying out step S404;

S410: outputting the assignment scheme for surplus slabs and orders in the current group.

According to another aspect of the present invention, a device for assigning surplus slabs the slab pre-yard to orders before hot rolling process includes:

a modeling unit configured to quantitatively describe assignment of surplus slabs in the slab yard with a mathematical model, said quantitative description comprising choosing decision variables, setting optimization objectives and determining constraints on assignment of surplus slabs;

an initializing unit configured to set parameters of the mathematical model constructed by said modeling unit;

a grouping unit configured for grouping order data and slab data based on steel grades, each group including slabs with the same steel grade and orders matching the steel grade of slabs in the group, and no slab in one group can be assigned to an order of another group;

an assignment scheme generating unit configured for obtaining an assignment scheme for surplus slabs and orders in each group with the mixed scatter search algorithm;

an assigning unit configured to assign said surplus slabs in the slab yard to orders according to said assignment scheme.

The method and device for assigning surplus slabs in the slab pre-yard rolling orders before hot rolling provided in the present invention may, from the viewpoint of global optimization, consider factors involved in assigning surplus slabs in a comprehensive manner, such as steel grade, width, length, weight, priority, and integrity, for sufficient and reasonable matching of surplus inventory of the hot rolling slab pre-yard, which may effectively reduce quantity of surplus slabs inventory, reduce cut-loss of slabs, increase the hot-charging ratio, reduce loss caused by taking slabs with high steel grade as low steel grade ones and enhance order's integrity at the same time.

To achieve the above described and related objects, one or more aspects of the present invention include features that will be described in detail hereinbelow and specifically defined in claims. The following description and accompanying drawings elaborate some illustrative aspects of the present invention. However, these aspects only illustrate some of the various modes in which the principle of the present invention may be applied. Furthermore, it is intended that the present invention comprises all these aspects and their equivalents.

BRIEF DESCRIPTION OF DRAWINGS

Other purpose and effects of the present invention will become more apparent and easier to understand with reference to the following description with respect to accompanied drawings and claims and with a more complete understanding of the present invention. In the drawings:

Identical reference numerals indicate similar or corresponding features or functions throughout the drawings.

DETAIL DESCRIPTION

Specific embodiments of the present invention will be described in detail below with reference to drawings.

Figure 1:
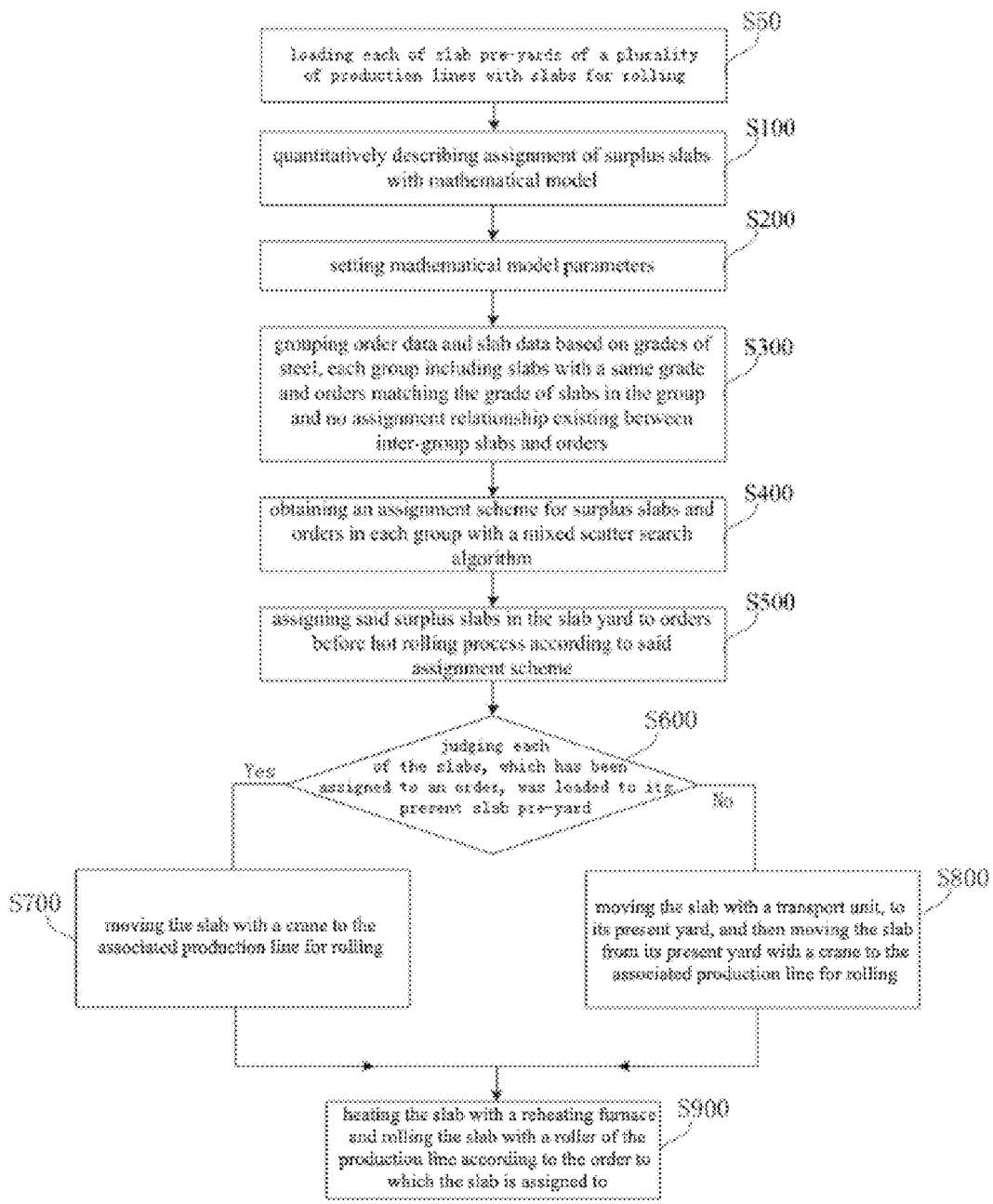
FIG. 1 is a flow chart of the method for assigning surplus slabs in the slab pre-yard to orders before hot rolling according to the present invention.

FIG. 1 shows a flow chart of the method for assigning surplus slabs in the slab pre-yard to orders before hot rolling process according to the present invention.

As shown in FIG. 1, the method for assigning surplus slabs in the slab pre-yard to orders before hot rolling process as disclosed by the present invention mainly includes the following steps:

S100: describing the assignment of surplus slabs to orders with a mathematical model in a quantification manner;

S200: setting parameters for the mathematical model used in step S100;

S300: grouping order data and slab data based on steel grades, each group including slabs with the same steel grade and orders matching the steel grade of slabs in the group and no assignment relationship existing between a slab and an order belonging to different groups;

S400: obtaining an assigning scheme of surplus slabs to orders in each group with the mixed scatter search algorithm;

S500: assigning surplus slabs in the slab pre-yard before hot rolling process based on the assignment scheme obtained in step S400, S600: judging whether each of the slabs, which has been assigned to an order, was loaded to a slab pre-yard of a production line which the order specifies, in other words, judging whether a slab stays in its present yard. A present yard which a specific slab stays in indicates the slab pre-yard of a production line that the order, to which the specific slab is assigned, specifies, and therefore said slab will be rolled by this production line, without being moved to other production lines;

S700: if it is determined in step S600 that, the slab stays in its present yard, then moving the slab with a first crane to the production line associated with the present yard for rolling. In an embodiment, the first crane may be a computer-controlled crane operated according to the assignment scheme.

S800: if it is determined in step S600 that, the slab is not staying in its present yard, then moving the slab with a transport unit, such as a truck, to the production line to which the order, which the slab has been assigned to, has specified, namely, moving the slab to its present yard, and then moving the slab from the present yard to the associated production line for rolling. In an embodiment, the transport unit may be a computer-controlled transport unit operated according to the assignment scheme. In an embodiment, the slab may be moved to the associated production line using a computer-controlled crane operated according to the assignment scheme.

S900: heating the slab with a reheating furnace and rolling the slab with a roller of the production line according to the order to which the slab is assigned.

wherein the quantifying description in step S100 includes choosing decision variables, setting optimization objectives and determining constraints on assignment of surplus slabs. These steps will be described in detail below respectively:

1.1: Choosing Decision Variables

Assuming the decision variable $x_{ij}$ represents the assignment relationship between surplus slabs and orders, when a surplus slab i is assigned to order j, $x_{ij}=1$, otherwise it equals to 0;

1.2: Setting Optimization Objectives

The optimization objectives include minimizing the number of surplus slabs which are of high steel grade and assigned to the orders requiring lower steel grade, minimizing slab cut-loss, maximizing the hot-charged ratio, maximizing the reward for punctual delivery of orders, minimizing punishments for over-quantity and lack-quantity of orders, minimizing inventory costs caused by surplus slabs.

Wherein, minimizing the number of surplus slabs which are of high steel grade and assigned to the orders requiring lower steel grade, is expressed as:

$$\text{Min} \sum_{j=1}^{M} \sum_{i=1}^{N} c1_{ij} x_{ij}$$

wherein M is the set of all orders of customers, N is the set of all surplus slabs, $c1_{ij}$ is the cost incurred by grade difference when assigning surplus slab i to order j.

Minimizing slab cut-loss, i.e. reducing cut-loss caused by specification difference when assigning slabs to orders, is expressed as:

$$\text{Min} \sum_{j=1}^{M} \sum_{i=1}^{N} c2_{ij} x_{ij}$$

wherein, $c2_{ij}$ is the cost of cut-loss incurred by specification difference in weight, width, and length when assigning a surplus slab i to an order j.

Maximizing the hot charging rate, which means when the time interval between the cutting time of a slab and the current time is smaller than 12 hours, the slab is a hot slab, and a hot slab will take precedence to be assigned to an order for rolling, which may reduce thermal loss and energy consumption in hot rolling process, is expressed as:

$$\text{Max} \sum_{j=1}^{M} \sum_{i=1}^{N} P_i x_{ij}$$

wherein $P_i$ is the precedence reward of thermal condition for surplus slab i.

Maximizing the reward for punctual delivery of orders, i.e., assigning surplus slabs to whichever order that has the earliest delivery date as much as possible, is expressed as:

$$\text{Max} \sum_{j=1}^{M} \sum_{i=1}^{N} R_j x_{ij}$$

wherein, $R_j$ is the priority reward of delivery date for order j.

Minimizing over-quantity and lack-quantity punishment in orders means that, when the total slab weight in an order exceeds the order's demand, slab wastage occurs; on the other hand, when the total slab weight in an order is smaller than the order's demand, customer's demand cannot be satisfied. Therefore, punishment should be conducted for both the above-mentioned cases, which are expressed as:

$$\text{Min} \sum_{j=1}^{M} (q_1 lack_j + q_2 over_j)$$

$$lack_j = \max\left\{0, o_j - \sum_{i=1}^{N} x_{ij}w_i\right\}$$

$$over_j = \max\left\{0, \sum_{i=1}^{N} x_{ij}w_i - o_j\right\}$$

wherein, $q_1$ is a punishment cost coefficient of lack-weight for an order; $q_2$ is a punishment cost coefficient of over-weight for an order; lack is the value of lacked weight for the present order j; $over_j$ is the value of overweight for the present order j; $o_j$ represents the demand weight of the present order j; and $w_i$ represents the weight of the surplus slab i.

Minimizing inventory costs caused by surplus slabs is expressed in a quantification manner as:

$$\text{Min} \sum_{i=1}^{N} b_i(1 - x_{ij})$$

wherein $b_i$ is the inventory cost caused by a surplus slab i.

Then the present invention converts process indices in the assigning process into an objective function, which is expressed as:

$$\text{Min} \sum_{j=1}^{M} \sum_{i=1}^{N} (c1_{ij} + c2_{ij})x_{ij} + \sum_{i=1}^{N} b_i(1 - x_{ij}) - \sum_{j=1}^{M} \sum_{i=1}^{N} P_i x_{ij} - \sum_{j=1}^{M} \sum_{i=1}^{N} R_j x_{ij} + \sum_{j=1}^{M} (q_1 lack_j + q_2 over_j)$$

1.3: Determining Constraints on Assignment of Surplus Slabs

The following technological regulations need to be considered when establishing assigning scheme for surplus slabs:

1.3.1) Production process constraint: each surplus slab is allowed to be assigned to one order at most, and is not allowed to be cut into pieces for assignment, which constraint is expressed in mathematical expression as:

$$\sum_{j=1}^{M} x_{ij} \leq 1, i = 1, \ldots, N$$

1.3.2) Order demand constraint: to reduce residual materials for each order, upon completion of the matching process (assignment process), over-weight of each order is required to be smaller than the weight of any slab assigned to it, which constraint is expressed in mathematical expression as:

$$\sum_{i=1}^{N} x_{ij}w_i - o_j < w_{i'}x_{i'j} + (1 - x_{i'j})M,$$

$$i' = 1, 2, \ldots, N \quad j = 1, 2, \ldots, M$$

1.3.3) Constraint on specifications: matching relevant specifications is mainly considered in terms of grade, width, weight and length. That is, the following are taken into account for determining whether a slab is matching with an order: whether the grade of the slab should be the same as that required by order, or be one of those with which the required steel grade can be substituted; and whether the width, weight and length of the slab is within the range allowed by the order, which constraint is converted into a mathematical expression as follows:

$$x_{ij} \leq M_{ij} \quad i=1, 2, \ldots, N \quad j=1, 2, \ldots, M$$

wherein $M_{ij}$ is the matching flag for surplus slab i and order j, and the flag is 1 when all the matching specifications are satisfied, and 0 for else.

1.3.4) Constraint on decision variable value:

$$x_{ij} \in \{0, 1\} \quad i=1, 2, \ldots, N \quad j=1, 2, \ldots, M$$

After quantitatively describing the assignment of surplus slabs with a mathematical model, the parameters of the mathematical model may be set based on parameters of practical operation.

After setting mathematical model parameters, order data and slab data are grouped based on steel grades, with each group including slabs with the same grade and orders whose steel grade can match with the steel grade of slabs in the same group, and after grouping, a slab is not assigned to an order belonging to a different group. Based on the constraint on specification described in step I, an assignment node (i, j) is set up for a slab i and an order j in each group, wherein the assignment node (i, j) means that the surplus slab i is assigned to the order j.

After grouping, an assignment scheme for assigning surplus slabs to orders in each group may be obtained by means of the mixed scatter search algorithm, and finally the surplus slabs in the slab pre-yard before hot rolling are assigned according to the resulting assignment scheme.

In the mixed scatter search algorithm, let $x=[a_1, a_2, \ldots, a_n]$ denote an assignment scheme, wherein $a_i$ denotes that slab i is assigned to order $a_i$; f(s) is the calculated objective function value for the assignment scheme s based on the objective function proposed in step I; let PSize be the population size of the original assignment scheme; Refset be the reference set, wherein each element in the reference set denotes one assignment scheme; $b_1$ and $b_2$ are the numbers of assignment schemes with good quality and assignment schemes with good dispersity in the reference set respectively; Iter is the counter for number of iterations; MaxIter is the maximum number of iterations; NewElements is the update mark of the reference set; NewSubsets is the subset of assignment schemes, and AlterSet is the set of candidate schemes. Specific steps of the mixed scatter search algorithm are as follows:

S401: initializing parameters of the algorithm. Values of the population size of original assignment scheme PSize, the maximum number of iterations MaxIter, b1 and b2 are set, and let NewElements=FALSE, Iter=0 and AlterSet=($\Phi$);

S402: constructing initial population of assignment schemes with heuristics methods and a randomization strategy respectively;

S403: constructing the assignment scheme reference set Refset based on the initial population of assignment schemes, namely Refset={$x_1, \ldots, x_{b_1}, x_{b_1+1}, \ldots, x_{b_1+b_2}$}, and setting NewElements=TRUE;

S404: setting the reading of the iterations counter Iter=Iter+1. If Iter>MaxIter or NewElements=FALSE, then proceeding to step S410; otherwise, constructing a scheme subset NewSubsets based on assignment schemes in Refset;

S405: choosing an assignment scheme subset s in NewSubsets, and combining assignment schemes in the assignment scheme subset s with a scheme combination method to generate a new assignment scheme $x_{new}$;

S406: improving the new assignment scheme $x_{new}$ with a variable depth search strategy to get an improved assignment scheme x';

S407: if the assignment scheme x' does not exists in the reference set Refset or the candidate set AlterSet, and the objective function value of assignment scheme x' is smaller than the objective function value of any assignment scheme in the reference set Refset, then putting said improved assignment scheme x' into the scheme candidate set AlterSet;

S408: deleting the subset s from NewSubsets, if NewSubsets is empty, then proceeding to step S409; otherwise, executing step S405;

S409: updating the reference set Refset, if the reference set is updated, letting NewElements=TRUE; otherwise, NewElements=FALSE, and carrying out step S404;

S410: outputting the assignment scheme for surplus slabs and orders in the current group.

The method for constructing assignment scheme reference set Refset involved in the above-mentioned mixed scatter search algorithm S403 is to select assignment schemes with good quality and assignment schemes with best dispersivity in the original assignment scheme population and add the selected assignment schemes into the assignment scheme reference set Refset. Assuming the size of the assignment scheme reference set Refset is $b=b_1+b_2$, wherein $b_1$ is the number of assignment schemes with good quality and $b_2$ is the number of assignment schemes with best dispersivity, therefore $|RefSet|=b_1+b_2$. In the present invention, assignment schemes with small objective function values are defined as assignment schemes with good quality, and steps for constructing assignment scheme reference set are as follows:

S403.1: Sorting assignment schemes in the original assignment scheme population in accordance with their objective function values, sequentially selecting $b_1$ assignment schemes with the smallest objective function values and add the selected assignment schemes into the reference set and deleting the $b_1$ assignment schemes from the original assignment scheme population.

S403.2: Calculating dispersion value of remaining individual assignment schemes in the original assignment scheme population respectively, then adding assignment schemes with best dispersity (i.e., with maximum dispersion value) into the reference set and deleting them from the population. Continuing the above-mentioned process until $b_2$ assignment schemes with best dispersities are found in the population.

The method for calculating dispersity (or dispersion values) of assignment schemes in the population is as follows:

Assuming one of assignment schemes in the population $x_1=[a_1, a_2, \ldots, a_i, \ldots, a_n]$, wherein $a_i$ represents that slab i is assigned to order $a_i$, and assuming one assignment scheme in the reference set Refset $x_2=[b_1, b_2, \ldots, b_i, \ldots, b_n]$, then the dispersion value of the assignment scheme $x_1$ is:

$$div(x_1) = \min_{x_2 \in RefSet} \{d(x_1, x_2)\},$$

wherein $d(x_1, x_2) = d_1 + d_2 + \ldots + d_i + \ldots + d_n$, $$d_i = \begin{cases} 0 & \text{if } a_i = b_i \\ 1 & \text{otherwise} \end{cases}.$$

The assignment scheme subset contained in the scheme subset NewSubsets involved in the above-mentioned mixed scatter search algorithm S404 is a dual scheme subset, which is constructed as follows: choosing two assignment schemes from the reference set Refset to constitute one scheme subset s, $s=\{x_1, x_2\}$, wherein $x_1$ and $x_2$ are two different assignment schemes. While constructing the assignment scheme subset, it is required that at least one of the two assignment schemes constituting the subset is the assignment scheme with good quality, then the number of binary scheme subsets in the scheme subset NewSubsets is $C_{b_1}^1 C_{b_2}^1 + C_{b_1}^2$.

In the combination of assignment schemes in the assignment scheme subset s involved in the above-mentioned mixed scatter search algorithm S405, assuming $s=\{x_1, x_2\}$, wherein $x_1=[a_1, a_2, \ldots, a_i, \ldots, a_n]$ and $x_2=(b_1, b_2, \ldots, b_i, \ldots, b_n)$ are two assignment schemes in subset s, then a new assignment scheme generated $x_{new}=[c_1, c_2, \ldots, c_i, \ldots, c_n]$ being expressed as $$c_i = \begin{cases} a_i & \text{if } a_i = b_i \\ -1 & \text{otherwise} \end{cases}$$

In the variable depth search strategy involved in the above-mentioned mixed scatter search algorithm S406, each assignment scheme corresponds to one node, assuming that $x_{new}$ is the original assignment scheme, d is the layer number of the current search tree, L is the maximum number of layers of the search tree, $n_1$ is the number of nodes with best quality selected from each layer, $n_2$ is the number of nodes generated from each parent node, and NodeList(d) is the list for storing nodes in the $d^{th}$ layer of the search tree, specific steps of the variable depth search strategy are as follows:

S406.1: Initialization. Setting values of L, $n_1$, and $n_2$; setting d=0, deleting all elements in the list NodeList(d), and setting $x_{new}$ as a root node;

S406.2: Performing neighborhood search for the root node, setting d=d+1 and selecting $n_1$ assignment schemes with smallest objective function values from the searching neighborhood of the root node as nodes in the $d^{th}$ layer;

S406.3: Performing neighborhood search for each node of the $d^{th}$ layer, selecting $n_2$ assignment schemes with smallest objective function values from the searching neighborhoods of each node in the $d^{th}$ layer and adding them into the NodeList(d+1);

S406.4: When neighborhoods of all nodes in the $d^{th}$ layer are searched, there are totally $n_1 \times n_2$ nodes in list NodeList (d+1), selecting $n_1$ assignment schemes with smallest objective function values from NodeList(d+1) as nodes in the $d+1^{th}$ layer;

S406.5: Setting d=d+1, if d<N, carrying out step (b3); otherwise, terminating the algorithm, and selecting a node with smallest objective function value from nodes involved in the whole search process, denoting it as x';

The method for updating reference set Refset involved in the above-mentioned mixed scatter search algorithm S406 is as follows: recording all improved assignment schemes obtained in the search process, updating the reference set Refset once when the assignment scheme subset is empty, that is, replacing the solution with maximum objective function value in the reference set only with an improved assignment scheme. For each improved assignment scheme, checking if the improved assignment scheme has an objective function value smaller than that of the assignment scheme in the reference set. If so, replacing the assignment scheme with the largest objective function value in the reference set with the improved assignment scheme, and if not, checking the updating of the next improved scheme.

Figure 2:
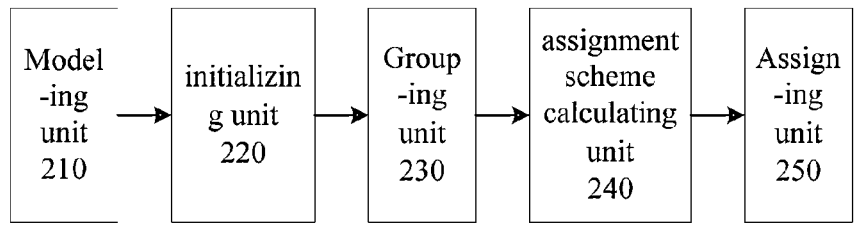
FIG. 2 is a block diagram of the device for assigning surplus slabs in the slab pre-yard to orders before hot rolling according to the present invention.

Corresponding to the above-mentioned method for assigning surplus slabs in slab pre-yard before hot rolling, the present invention further provides a device for assigning surplus slabs in a hot rolling slab pre-yard, the block diagram of the device is shown in FIG. 2.

The assigning device 200 for surplus slabs in a hot rolling slab pre-yard according to the present invention includes a modeling unit 210, an initializing unit 220, a grouping unit 230, an assignment scheme computing unit 240 and an assigning unit 250, wherein the modeling unit 210 is configured to quantitatively describe the assignment of surplus slabs in the slab pre-yard with a mathematical model, wherein the quantitative description includes choosing decision variables, setting optimization objectives and determining constraints on surplus slab assignment; the initializing unit 220 is configured to set parameters of the mathematical model constructed in said modeling unit; the grouping unit 230 is configured for grouping order data and slab data based grades of steel, each group including slabs with the same grade and orders whose required steel grade is match with the steel grade of slabs in the group, and wherein a slab is not assigned to an order in a different group; the assignment scheme computing unit 240 is configured for obtaining an assignment scheme for assigning surplus slabs to orders in each group with the mixed scatter search algorithm; the assigning unit 250 is configured to assign surplus slabs in the slab pre-yard before hot rolling according to the assignment scheme obtained by the assignment scheme computing unit 240.

In addition, the assigning device for assigning surplus slabs in the slab pre-yard before hot rolling according to the present invention may also be embedded into an assigning system for assigning surplus slabs in the slab pre-yard programmed, which is based on visual programming, and which includes functional modules of: an authorized user login module, a data downloading module, a data management module, a parameter adjustment module, an assignment scheme automatic-generating module, an assignment scheme displaying and evaluating module, an assignment scheme modifying module, an assignment scheme uploading module and a system configuring module, the functions of each module are as follows:

The authorized user login module: entering the software system upon system authentication by inputting user name and password;

The data downloading module: connected with enterprise ERP system to download necessary surplus slabs and customer order data into a database;

The data management module: managing the surplus slab data and order data, with functions including adding, deleting and modifying data;

The parameter adjustment module: including two parts, a module parameter adjustment part and an algorithm parameter adjustment part, in which the module parameter adjustment is to adjust parameters involved in the mathematical model obtained in step S100, and algorithm parameters include parameters of the mixed scatter search algorithm involved in step S400;

The assignment scheme automatic-generating module: embedding the above-mentioned assigning device for assigning surplus slabs in the slab pre-yard into this module for automatically generating assignment schemes;

The assignment scheme displaying and evaluating module: displaying the generated assignment schemes in form of sheet format and graphical format and generating index values for evaluating the assignment scheme obtained by the proposed algorithm, such as the objective function value, run time of the algorithm, the cut-loss, the amount of completed orders and the amount of completed emergent orders, and comparing them with assignment schemes obtained manually;

The assignment scheme modifying module: allowing manual modification to assignment schemes;

The assignment scheme uploading module: uploading assignment schemes to the enterprise ERP system and releasing the assignment schemes to production when planners are satisfied with them;

The system configuring module: the planners may maintain address, ports of the server, name of the database and user name and password via this module.

In specific applications, the implementation of the assigning system for assigning surplus slabs in the slab pre-yard before hot rolling according to the present invention needs the following devices: at least one PC, at least one cable interface or optical cable interface, at least one router, which constitute a small LAN and then the LAN is connected to an enterprise ERP system. In the PC, the database system Microsoft SQL Server 2000 and the software provided according to the present invention are installed, and the system's server address, server ports and database's name, and user names and passwords are configured. Upon completion of system installation, an assignment scheme for assigning surplus slabs is obtained by operating in accordance with the following steps:

The first step: after starting up the software system, the user inputs user name and password, if the user is invalid, he or she cannot enter the system; if the user is an valid user, he or she can enter the optimizing and matching system.

The second step: connecting with the enterprise ERP system to download necessary surplus slabs and customer order data into a database. The information fields of the downloaded surplus slab include slab number, No. of order to which the slab belongs (empty initially), cutting time, thickness, length, standard width, head width, tail width, weight, moving direction, state, stock position, error code, material group, steel grade, transfer/delivery plan number, rolling/cutting plan number. The information fields of the downloaded order include No. of order, Backlog, steel grade, state, order property, order quantity, upper limit of order tolerance, lower limit of order tolerance, maximum weight of the finished product, minimum weight of the finished product, in-plant delivery date, customer's due date, order type, rolling thickness, lack-weight of application process, lack-weight of hot rolling, upper limit of slab width, lower limit of slab width, upper limit of slab length, lower limit of slab length, upper limit of slab weight, lower limit of slab weight, material group, direction of hot rolled coil, batch code, width of a finished product, quantity in yard before steel making, quantity in the yard before hot rolling, quantity in the yard before slab finishing, charging coefficient and outsourcing mark.

The third step: upon completion of data downloading, inputting model parameter information and algorithm parameter information in the parameter adjustment module, wherein the model parameter information mainly includes range of orders involved in assigning, integrity condition of order, condition parameters required by assigning including grades, width, length, weight of a slab, precedence reward for slab thermal condition, and priority parameters of orders; and the algorithm parameter information includes the size of population of original assignment scheme population PSize, $b_1$-number of assignment schemes with good quality in reference set, $b_2$-number of assignment schemes with good dispersity in reference set, maximum number of iterations MaxIter, maximum depth L of variable depth neighborhood search strategy, $n_1$-number of best nodes selected in each layer, and $n_2$-number of most feasible schemes selected for each node.

The fourth step: automatically generating assignment schemes of surplus slabs based on the algorithm of surplus slabs in the slab pre-yard before hot rolling provided in the present invention.

The fifth step: for assignment schemes of surplus slabs automatically generated by the system (i.e., the outcome of the algorithm), the user may view them in forms of graph and data sheet, and may modify results (including cancellation and re-establishment of assigning relationship) with a graphic editor if he or she is not satisfied with the schemes until satisfaction; and the system would check for violation for the current assignment scheme each time the user modifies it. If the user is satisfied with the outcome, he or she may upload a matching scheme to the enterprise ERP system for distribution and implementation.

Applications of the method and device for assigning surplus slabs in a hot rolling the slab pre-yard before hot rolling provided in the present invention will be explained in detail with reference to a specific embodiment.

10 sets of surplus slab data and order data from practical production of a certain steel enterprise are used, wherein the quantity of surplus slabs and the quantity of orders are shown in the following table:

| Item | Group | | | | | | | | | |
|---|---|---|---|---|---|---|---|---|---|---|
| | 1 | 2 | 3 | 4 | 5 | 6 | 7 | 8 | 9 | 10 |
| Quantity of surplus slabs | 978 | 1093 | 1063 | 1105 | 1129 | 1144 | 796 | 1234 | 1534 | 1603 |
| Quantity of orders | 956 | 998 | 290 | 999 | 968 | 973 | 333 | 932 | 695 | 461 |

Assignment schemes for surplus slabs of individual groups are obtained with the aforementioned assigning method for surplus slabs in the slab pre-yard before hot rolling, with specific steps of:

The first step: after starting up the software system, the user inputs user name and password to enter the optimizing and matching system.

The second step: connecting with the enterprise ERP system to download necessary surplus slabs data and customer order data into a database. The information fields of the downloaded surplus slab include slab number, No. of order to which the slab belongs (empty initially), cutting time, thickness, length, standard width, head width, tail width, weight, going direction, state, stock position, error code, material group, steel grade, transfer/delivery plan number, rolling/cutting plan number. The information fields of the downloaded order include No. of order, Backlog, steel grade, state, order property, order quantity, upper limit of order tolerance, lower limit of order tolerance, maximum weight of the finished product, minimum weight of the finished product, in-plant delivery date, customer's due date, order type, rolling thickness, lack-weight of application process, lack-weight of hot rolling, upper limit of slab width, lower limit of slab width, upper limit of slab length, lower limit of slab length, upper limit of slab weight, lower limit of slab weight, material group, direction of hot rolled coil, batch code, finished width, quantity in yard before steel making, quantity in the yard before hot rolling, in-yard quantity in the yard before slab finishing, charging coefficient and outsourcing mark.

The third step: inputting model parameter information and algorithm parameter information in the parameter adjustment module, wherein the model parameter information mainly includes range of orders involved in assigning, integrity condition of order, condition parameters required by the assigning including grades, width, length, weight of a slab, precedence reward for slab thermal condition, and priority parameters of orders; and the algorithm parameter information includes the size of original assignment scheme population PSize which is set to 10, number of assignment schemes with good quality in reference set $b_1$ which is set to 3, number of assignment schemes with good dispersity in reference set $b_2$ which is set to 3, maximum number of iterations MaxIter, maximum depth L of variable depth neighborhood search strategy which is set to 5, number of best nodes selected in each layer $n_1$ set to 5, and number of most feasible schemes selected for each node $n_2$ set to 5.

The fourth step: automatically generating assignment schemes of surplus slabs based on the assigning method of surplus slabs in the slab pre-yard before hot rolling provided in the present invention.

Step 4.1: Initializing algorithm parameters. Let the value of the population size of original assignment scheme PSize=10, the maximum number of iterations MaxIter=50, $b_1$=3 and $b_2$=3, and set NewElements=FALSE, Iter=0 and AlterSet=$\Phi$;

Step 4.2: Constructing original assignment scheme population with heuristic algorithm and randomization strategy respectively;

Step 4.3: Constructing an assignment scheme reference set Refset based on the original assignment scheme population, namely Refset=$\{x_1, \ldots, x_{b_1}, x_{b_1+1}, \ldots, x_{b_1+b_2}\}$, and setting NewElements=TRUE;

Step 4.4: Setting Iter=Iter+1. If Iter>MaxIter or NewElements=FALSE, then proceeding to Step 4.10; otherwise, constructing scheme subset NewSubsets based on assignment schemes in Refset;

Step 4.5: Choosing an assignment scheme subset s in NewSubsets, and combining assignment schemes in the assignment scheme subset s with a scheme combining method to generate a new assignment scheme $x_{new}$;

Step 4.6: Improving the new assignment scheme $x_{new}$ with a variable depth search strategy to get an improved assignment scheme x';

Step 4.7: If the assignment scheme x' is not in the reference set Refset or the candidate set AlterSet, and the objective function value of x' is smaller than the objective function value of any assignment scheme in the reference set Refset correspond, then adding the improved assignment scheme x' into the scheme candidate set AlterSet;

Step 4.8: Deleting the subset s from NewSubsets. If NewSubsets is empty, proceeding to Step 4.9; otherwise carrying out Step 4.5;

Step 4.9: Updating the reference set Refset, if the reference set is updated, letting NewElements=TRUE; otherwise NewElements=FALSE. Carrying out Step 4.4.

Step 4.10: Outputting the assignment scheme for surplus slabs and orders in the current group.

Heuristic algorithms involved in the above-mentioned mixed scatter search algorithm in Step 4.2 include algorithm I, algorithm II, algorithm III and algorithm IV. 4 original assignment schemes may be generated by these four heuristic algorithms. Additional 6 assignment schemes are constructed by a random strategy. The resulting 10 assignment schemes constitute an original assignment scheme population. Specific steps of the four heuristic algorithms and the random strategy respectively are as follows:

Algorithm I:

Step 4.2.1.1: Calculating weights $W_{ij}$ for individual nodes in each group established in step S300 according to the objective function set in step S100;

Step 4.2.1.2: Selecting an assignment node (i*, j*) having the smallest weight and having not been visited. Proceeding to step 4.2.1.4 if there is no assignment node that has not been visited. Assigning slab i* to order j* if the quantity demanded by order j* is not met.

Step 4.2.1.3: Labeling the assignment node (i*, j*) as visited and proceeding to step 4.2.1.2;

Step 4.2.1.4: Outputting the assignment scheme $x=[a_1, a_2, \ldots, a_i, \ldots, a_n]$, wherein $a_i$ represents slab i is assigned to order $a_i$.

Algorithm II:

Step 4.2.2.1: Re-sorting slabs in a group in the non-increasing order of their thermal condition priority reward values $P_i$;

Step 4.2.2.2: If the slab sequence is empty, proceeding to step 4.2.2.4. Taking out the first slab i* from the slab sequence and selecting the assignment node (i*, j*) with the largest weight value from all the assignment nodes containing slab i*. If such an assignment node (i*, j*) exists and the quantity demanded by order j* is not met, assigning slab i* to order j*.

Step 4.2.2.3: Deleting slab i* from the slab sequence and proceeding to Step 4.2.2.2.

Step 4.2.2.4: Outputting the assignment scheme $x=[a_1, a_2, \ldots, a_i, \ldots, a_n]$, wherein $a_i$ represents slab i is assigned to order $a_i$.

Algorithm III:

Step 4.2.3.1: Re-sorting orders in the group in the non-increasing order of their delivery date priority reward $R_j$;

Step 4.2.3.2: If the order sequence is empty, proceeding to Step 4.2.3.4. Taking out the first order j* from the sequence;

Step 4.2.3.3: Selecting the assignment node (i*, j*) having the largest weight and having not been visited from all assignment nodes containing order j*. If such an assignment node (i*, j*) exists and the quantity demanded by order j* is not met, assigning slab i* to order j*, and labeling the assignment node (i*, j*) as visited, and repeating Step 4.2.3.3; otherwise deleting order j* from the order sequence and proceeding to Step 4.2.3.2;

Step 4.2.3.4: Outputting the assignment scheme $x=[a_1, a_2, \ldots, a_i, \ldots a_n]$, wherein $a_i$ represents slab i is assigned to order $a_i$.

Algorithm IV:

Step 4.2.4.1: Re-sorting orders in the group in the non-increasing order of their delivery date priority reward $R_j$, and re-sorting slabs in the group in the non-increasing order of their thermal condition priority reward values $P_i$;

Step 4.2.4.2: If the order sequence is empty, proceeding to Step 4.2.4.4. Taking out the first order j* from the sequence;

Step 4.2.4.3: Selecting the first slab i* that met the surplus slab assignment constraints described in step S100 from the slab sequence for order j*, if the quantity demanded by order j* is not met, then assigning slab i* to order j*, and deleting slab i* from the sequence, and repeating Step 4.2.4.3; otherwise, deleting order j* from the order sequence and proceeding to Step 4.2.4.2;

Step 4.2.4.4: Outputting the assignment scheme $x=[a_1, a_2, \ldots a_i, \ldots, a_n]$, wherein $a_i$ represents slab i is assigned to order $a_i$.

Random Strategy:

Step 4.2.5.1: Randomly generating a slab i* in those slabs that have not been visited;

Step 4.2.5.2: Randomly generating an assignment node (i*, j*) from all the assignment nodes containing slab i* and orders which demand a quantity that has not been met, assigning slab i* to order j*, updating the set of slabs not visited and assignment nodes containing orders which demand a quantity that has not been met;

Step 4.2.5.3: Repeating Step 4.2.5.1 until all slabs have been visited.

Step 4.2.5.4: Outputting the assignment scheme $x=[a_1, a_2, \ldots, a_i, \ldots, a_n]$, wherein $a_i$ represents slab i is assigned to order $a_i$.

The method for constructing assignment scheme reference set Refset involved in the above-mentioned mixed scatter search algorithm in Step 4.3 is to choose assignment schemes with good quality and assignment schemes with good dispersivity from the original assignment scheme population into the assignment scheme reference set Refset. Assume the size of assignment scheme reference set RefSet is 6, wherein 3 assignment schemes have good quality, and the other 3 assignment schemes have best dispersivity. In the present invention, assignment schemes with small objective function values are defined as assignment schemes with good quality, and steps for constructing assignment scheme reference set are as follows:

Step 4.3.1: Sorting assignment schemes in the original assignment scheme population in accordance with their objective function values, sequentially selecting 3 assignment schemes with the smallest objective function values and add the selected assignment schemes into the reference set and deleting the 3 assignment schemes from the original assignment scheme population.

Step 4.3.2: Calculating dispersion value of remaining individual assignment schemes in the original assignment scheme population respectively, then adding assignment schemes with best dispersity (i.e., with maximum dispersion value) into the reference set and deleting them from the population. Continuing the above-mentioned process until 3 assignment schemes with best dispersities are found in the population.

The method for calculating dispersion values of assignment schemes in the population is as follows:

Assuming an assignment scheme $x_1=[a_1, a_2, \ldots, a_i, \ldots, a_n]$ is an scheme from the population, wherein $a_i$ represents that slab i is assigned to order $a_i$, and assuming an assignment scheme $x_2=[b_1, b_2, \ldots, b_i, \ldots, b_n]$ is an scheme from the reference set RefSet, then the dispersion value of the assignment scheme $x_1$ is:

$$div(x_1) = \min_{x_2 \in RefSet} \{d(x_1, x_2)\},$$

Wherein $d(x_1, x_2) = d_1 + d_2 + \ldots + d_i + \ldots + d_n$, $$d_i = \begin{cases} 0 & \text{if } a_i = b_i \\ 1 & \text{otherwise} \end{cases}.$$

The assignment scheme subset contained in the scheme subset NewSubsets involved in the above-mentioned mixed scatter search algorithm in Step 4.4 is a dual scheme subset, which is constructed as follows: choosing two assignment schemes from the reference set RefSet to constitute one scheme subset s, s={$x_1$, $x_2$}, wherein $x_1$ and $x_2$ are two different assignment schemes. While constructing the assignment scheme subset, it is required that at least one of the two assignment schemes constituting the subset is the assignment scheme with good quality, then the number of binary scheme subsets in the scheme subset NewSubsets is $C_{b_1}^1 C_{b_2}^1 + C_{b_1}^2$.

In the combination of assignment schemes in the assignment scheme subset s involved in the above-mentioned mixed scatter search algorithm in Step 4.5, assuming s={$x_1$, $x_2$}, wherein $x_1$=[$a_1$, $a_2$, ..., $a_i$, ..., $a_n$] and $x_2$=[$b_1$, $b_2$, ..., $b_i$, ..., $b_n$] are two assignment schemes in subset s, then a new assignment scheme generated $x_{new}$=[$c_1$, $c_2$, ..., $c_i$, ..., $c_n$] being expressed as $$c_i = \begin{cases} a_i & \text{if } a_i = b_i \\ -1 & \text{otherwise} \end{cases}$$

In the variable depth search strategy involved in the above-mentioned mixed scatter search algorithm Step 4.6, each assignment scheme corresponds to one node, assuming that $x_{new}$ is the original assignment scheme, d is the layer number of the current search tree, L is the maximum number of layers of the search tree, $n_1$ is the number of nodes with best quality selected from each layer, $n_2$ is the number of nodes generated from each parent node, and NodeList(d) is the list for storing nodes in the $d^{th}$ layer of the search tree, specific steps of the variable depth search strategy are as follows:

Step 4.6.1: Initialization. Setting L=5, $n_1$=5, and $n_2$=5; setting d=0; deleting all elements in the list NodeList(d); and setting $x_{new}$ as the root node;

Step 4.6.2: Performing Swap neighborhood search for the root node. Setting d=d+1, and selecting $n_1$ assignment schemes with smallest objective function values from the Swap neighborhood of the root node as nodes of the $d^{th}$ layer;

Step 4.6.3: Performing Swap neighborhood search for each node of the $d^{th}$ layer; choosing $n_2$ assignment schemes with smallest objective function values from the Swap searching neighborhood of each node of the $d^{th}$ layer and adding them into the NodeList(d+1);

Step 4.6.4: When Swap neighborhoods of all nodes in the $d^{th}$ layer are searched, there are totally $n_1 \times n_2$ nodes in list NodeList(d+1), choosing $n_1$ assignment schemes with smallest objective function values therefrom as nodes of the d+1$^{th}$ layer;

Step 4.6.5: Setting d=d+1, if d<N, carrying out Step 4.6.3; otherwise terminating the algorithm, and selecting the node with smallest objective function value from nodes involved in the whole search process, and denoting the selected node as x';

After obtaining the assignment scheme x', taking it as the original assignment scheme, repeating the above-mentioned variable depth search strategy, converting Swap neighborhood therein into Shift neighborhood and obtaining a new assignment schemes x' again.

Figure 3:
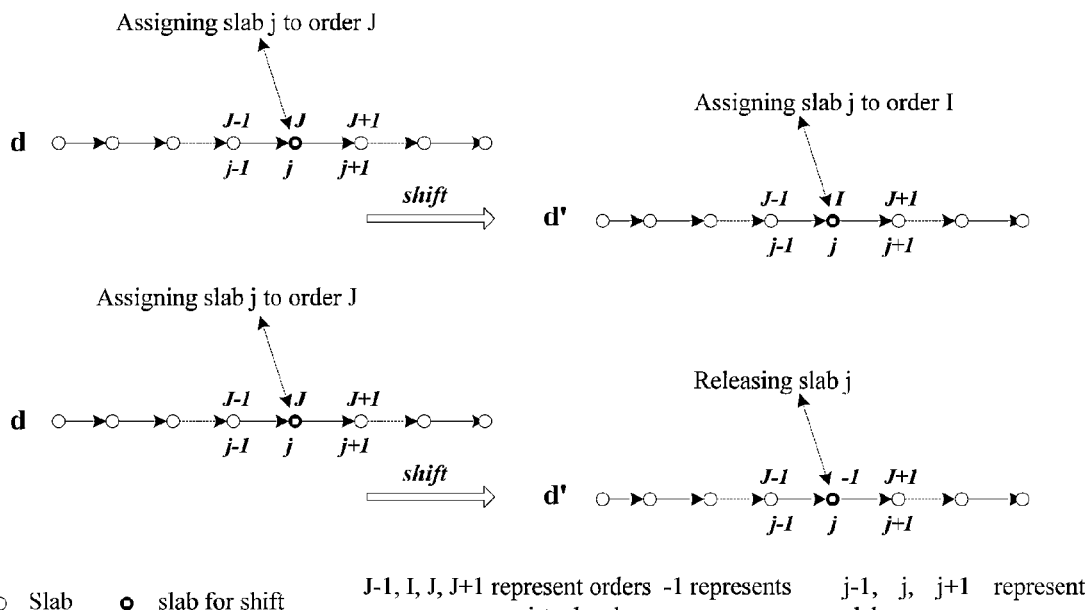
FIG. 3 is diagram of shift neighborhood used in tabu search algorithm in the present invention.

The Swap neighborhood involved in the above-mentioned variable depth search strategy is to exchange the assignment of slabs. If slab i is assigned to order I and slab j is assigned to order J, after swapping, slab i is assigned to order J, and slab j is assigned to order I. Virtual orders are introduced in the neighborhood search process to correspond to un-assigned slabs, which is denoted as "−1". As such, the swap of two orders may not only occur between two assigned slabs, but may also occur between a assigned slab and a un-assigned slab, thereby enlarging neighborhood range of traditional swap, as shown in FIG. 3.

Figure 4:
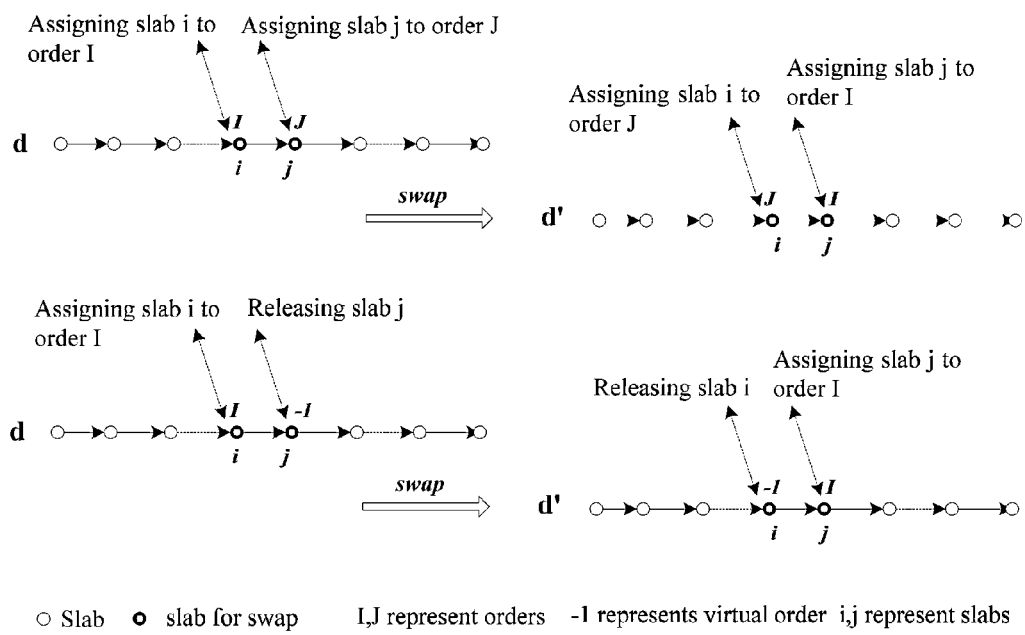
FIG. 4 is diagram of swap neighborhood used in tabu search algorithm in the present invention.

The Shift neighborhood involved in the above-mentioned variable depth search strategy is to change the assignment of a slab. For example, a slab is assigned to order I, after shifting, it is assigned to order J. Virtual orders are introduced in the neighborhood search process to correspond to non-assigned surplus slabs, which are denoted as "−1". At this point, shift neighborhood may also include that a slab is converted from a assigned slab to a un-assigned slab, namely, a slab, which is assigned to order I, is converted to be assigned to a virtual order −1, as shown in FIG. 4.

The fifth step: for assignment schemes of surplus slabs automatically generated by the system (i.e., the outcome of the algorithm), the user may view them in form of graphs and data sheets, and, if not satisfied with the schemes, may modify the schemes (including cancellation and re-establishment of assigning relationship) with a graphic editor until satisfaction; and the system would check for violation for the current assignment scheme each time the user modifies it. If the outcome is satisfied, the user may upload the matching scheme to the enterprise ERP system for distribution and implementation.

The following table includes 10 sets of data, which shows a comparison between assignment schemes for surplus slabs obtained with method of assigning surplus slabs in the slab pre-yard before hot rolling according to the present invention, and assignment schemes obtained manually.

| No. | Objective function | | quantity of assigned surplus slabs (t) | | Number of orders completed | | Number emergent orders completed | | Slab Cut-loss (t) | |
|---|---|---|---|---|---|---|---|---|---|---|
| | manual | The invention | manual | The invention | manual | The invention | manual | The invention | manual | The invention |
| 1 | −57389.1 | −58735.2 | 2092.11 | 2298.69 | 10 | 12 | 7 | 9 | 25.35 | 22.47 |
| 2 | −76972.1 | −78210.8 | 981.95 | 981.95 | 8 | 8 | 4 | 5 | 74.41 | 65.94 |
| 3 | −48148.7 | −49298.5 | 1881.66 | 2037.09 | 6 | 6 | 2 | 3 | 64.31 | 56.98 |

-continued

| | Objective function | | quantity of assigned surplus slabs (t) | | Number of orders completed | | Number emergent orders completed | | Slab Cut-loss (t) | |
|---|---|---|---|---|---|---|---|---|---|---|
| No. | manual | The invention | manual | The invention | manual | The invention | manual | The invention | manual | The invention |
| 4 | −92648.2 | −92760.8 | 1089.84 | 1246.38 | 4 | 4 | 2 | 2 | 58.55 | 51.31 |
| 5 | −72622.6 | −73735.1 | 2698.58 | 2970.75 | 14 | 15 | 6 | 9 | 65.05 | 58.31 |
| 6 | −84611.6 | −85845.2 | 2385.93 | 2612.23 | 10 | 12 | 4 | 5 | 35.99 | 32.34 |
| 7 | −78475.4 | −79600.5 | 1351.70 | 1381.70 | 8 | 8 | 5 | 6 | 38.07 | 33.67 |
| 8 | −208596.0 | −214702.0 | 2030.11 | 2338.64 | 11 | 13 | 9 | 10 | 32.01 | 28.21 |
| 9 | −225477.0 | −230597.0 | 1896.78 | 2062.27 | 7 | 9 | 6 | 7 | 39.87 | 35.14 |
| 10 | −241644.0 | −245079.0 | 3989.68 | 4331.18 | 26 | 30 | 19 | 21 | 41.22 | 36.54 |

From the above results, we can see that as compared with assignment schemes obtained manually, the assignment schemes obtained with the method provided by the present invention have an average enhancement of 9.13% in the quantity of assigned slabs, an average reduction of 11.36% in slab cut-loss, an average enhancement of 12.5% in number of orders completed, an average enhancement of 20.31% in number of emergent orders completed and an average reduction of 16.73% in matching over-quantity.

The method and device for assigning surplus slabs in the slab pre-yard before hot rolling according to the present invention have been described by way of example with reference to drawings. However, it should be understood by those skilled in the art that various modifications may be made for the above method and device for assigning surplus slabs in the slab pre-yard before hot rolling proposed in the present invention without departing from the scope of the present invention. Therefore, the scope of the present invention should be defined by contents of the appended claims.

What is claimed is:

1. A method for assigning surplus slabs in a slab yard to orders before a hot rolling process, the method comprising steps of:
   S50: loading each of slab pre-yards of a plurality of production lines with slabs for rolling;
   S100: quantitatively describing the assignment of the surplus slabs in the slab yard to the orders before hot rolling process with a mathematical model, said quantitative description comprises choosing decision variables, setting optimization objectives and constraints on the assignments of the surplus slabs, wherein setting optimization objectives includes:
      maximizing a hot-charged ratio of slabs that are loaded into reheating furnace loaded at a high temperature, hot slabs with intervals between cutting times when the hot slabs are being cut by a cutting machine and current time less than 12 hours taking precedence to be assigned to an order for rolling using a rolling machine, thereby reducing thermal loss, and
      minimizing a number of the surplus slabs which are of high steel grade and assigned to the orders requiring lower steel grade, thereby improving the suitability of the steel provided when fulfilling an order;
   S200: setting parameters of the mathematical model used in the step S100;
   S300: grouping order data and slab data based on steel grades, each group including slabs with a same steel grade and the orders matching the steel grade of slabs in the group, so that no slab in one group is assigned to an order of another group;
   S400: obtaining an assignment scheme for the surplus slabs and the orders in each group with a mixed scatter search algorithm;
   S500: assigning said surplus slabs in the slab yard to the orders before the hot rolling process by using said assignment scheme;
   S600: determining, according to the assignment scheme, whether a surplus slab, which has been assigned to an order, will stay in a present pre-yard the surplus slab was loaded to;
   S700: if it is determined in step S600 that the slab stays in the present pre-yard, then moving the slab with a first crane to the production line associated with the present pre-yard for rolling;
   S800: if it is determined in step S600 that the slab is not staying in the present pre-yard, then moving the slab with a transport unit to a second pre-yard, and then moving the slab from the second pre-yard with a second crane to a production line associated with the second pre-yard for rolling; and
   S900: heating the slab with a reheating furnace and rolling the slab with a roller of a production line according to the order to which the slab is assigned, the order operating to reduce an energy consumption of the reheating furnace,
   wherein the mixed scatter search algorithm used in the step S400 for each group further comprises steps of:
   S401: initializing parameters of the algorithm, setting a value of PSize which is size of initial population consisted of assignment schemes, a value of MaxIter which is a maximum number of iterations, a value of $b_1$ which is a number of the assignment schemes with good qualities in a reference set, and a value of $b_2$ which is a number of the assignment schemes with good dispersity in the reference set, setting an update mark of the reference set NewElements=FALSE, setting a reading of iterations counter Iter=0 and a candidate scheme set AlterSet=$\Phi$;
   S402: constructing initial population of the assignment schemes with heuristics methods and a randomization strategy respectively;
   S403: constructing the assignment scheme reference set Refset based on the initial population of the assignment schemes, namely Refset=$\{x_1, \ldots, x_{b_1}, x_{b_1+1}, \ldots, x_{b_1+b_2}\}$, and setting NewElements=TRUE; wherein $x_i$ stands for an assignment scheme, i=1, ... $b_1+b_2$;
   S404: setting the reading of iterations counter Iter=Iter+1, and if Iter>MaxIter or NewElements=FALSE, then proceeding to step S410; otherwise, constructing a scheme subset NewSubsets based on the assignment schemes in the Refset;

S405: choosing an assignment scheme subset s in NewSubsets, and combining the assignment schemes in the assignment scheme subset s with a scheme combination method to generate a new assignment scheme $x_{new}$;

S406: improving the new assignment scheme $x_{new}$ with a variable depth search strategy to get an improved assignment scheme x';

S407: if the assignment scheme x' does not exist in the reference set Refset or the candidate set AlterSet, and an objective function value of the assignment scheme x' is smaller than an objective function value of any assignment scheme in the reference set Refset, then putting said improved assignment scheme x' into a scheme candidate set AlterSet;

S408: deleting the subset s from NewSubsets, and if NewSubsets is empty, then proceeding to step S409; otherwise, executing the step S405;

S409: updating the reference set Refset, and if the reference set is updated, letting NewElements=TRUE; otherwise, NewElements=FALSE, and carrying out the step S404;

S410: outputting the assignment scheme for the surplus slabs and the orders in the group.

2. The method according to claim 1, wherein in the step S100, said setting optimization objectives comprises:
minimizing slab cut-loss to reduce cut-loss caused by specification difference when assigning the slabs to the orders;
maximizing reward for punctual delivery of the orders, therefore assign the surplus slabs to the orders which have an earliest delivery date as much as possible;
minimizing punishment for over-quantity and lack-quantity of an order so as to reduce slab wastage and owed quantity of the orders;
minimizing inventory costs occupied by the surplus slabs.

3. The method according to claim 1, wherein in the step S100, determining assignment constraints on the surplus slabs comprises:
production process constraint: each surplus slab is allowed to be assigned to one order at most, and is not allowed to be cut into pieces before being assigned to different orders;
constraint on quantity demanded by an order: upon completion of the process of the assignment, over-quantity of each order should be smaller than weight of any surplus slab that has assigned to this order;
constraint on specification-matching: differences between specification of the surplus slab and required specification of order should be within an allowed range, said matching specifications comprising steel grade, width, weight, and length;
constraint on decision variable value.

4. The method according to claim 1, wherein in the step S403, setting the size of the assignment scheme reference set Refset $b=b_1+b_2$, wherein $b_1$ is a number of the assignment schemes with good quality and $b_2$ is a number of the assignment schemes with best dispersity, therefore |Refset|=$b_1+b_2$;
defining the assignment schemes with small objective function values as the assignment schemes with good quality, and said constructing the assignment scheme reference set Refset based on the initial population of the assignment schemes comprises steps of:
(a1) sorting the assignment schemes in the initial population of the assignment schemes according to their objective function values, sequentially choosing $b_1$ assignment schemes with the smallest objective function values and adding them into the reference set and deleting said $b_1$ assignment schemes from the initial population of the assignment schemes;
(a2) calculating dispersion value of remaining individual assignment schemes in the initial population of the assignment schemes respectively, then adding the assignment scheme with a maximum dispersion value into the reference set and deleting it from the population;
(a3) continuing said processes (a1) and (a2) until $b_2$ assignment schemes with best dispersity are found in the population.

5. The method according to claim 4, wherein the method for calculating dispersion values of the assignment schemes in the population is as follows:
assuming one of the assignment schemes in the population $x_1=[a_1, a_2, \ldots, a_i, \ldots, a_n]$, wherein $a_i$, represents that slab i is assigned to order $a_i$, and assuming one assignment scheme in the reference set Refset $x_2=[b_1, b_2, \ldots, b_i, \ldots, b_n]$, then the dispersion value of the assignment scheme $x_1$ is:

$$div(x_1) = \min_{x_2 \in RefSet} \{d(x_1, x_2)\},$$

wherein $d(x_1, x_2) = d_1 + d_2 + \ldots + d_i + \ldots + d_n$, $$d_i = \begin{cases} 0 & \text{if } a_i = b_i \\ 1 & \text{otherwise} \end{cases}.$$

6. The method according to claim 1, wherein in the step S404, the assignment scheme subset contained in said scheme subset NewSubsets is a dual scheme subset, for which a constructing method is: choosing two assignment schemes from the reference set Refset to constitute one scheme subset s, $s=\{x_1, x_2\}$, wherein $x_1$ and $x_2$ are two different assignment schemes.

7. The method according to claim 6, wherein in the scheme subset NewSubsets, it is required that at least one of the two assignment schemes constituting the subset NewSubsets is an assignment scheme with good quality.

8. The method according to claim 1, wherein in the step 5405, the scheme combination method adopted for combining the assignment schemes in the assignment scheme subset s is implemented as follows:
assuming $s=\{x_1, x_2\}$, wherein $x_1=[a_1, a_2, \ldots, a_i, \ldots, a_n]$ and $x_2=(b_1, b_2, \ldots, b_i, \ldots, b_n)$ are two assignment schemes in subset s, then a new assignment scheme generated $x_{new}=(c_1, c_2, \ldots, c_i, \ldots, c_n)$ being expressed as $$c_i = \begin{cases} a_i & \text{if } a_i = b_i \\ -1 & \text{otherwise} \end{cases}.$$

9. The method according to claim 1, wherein, in the variable depth search strategy involved in the step S406, each of the assignment schemes corresponds to one node, assuming that $x_{new}$ is the original assignment scheme, d is a layer number of a current search tree, L is maximum number of layers of the current search tree, $n_1$ is a number of nodes with best quality selected from each layer, $n_2$ is a number of nodes generated from each parent node, and NodeList(d) is a list for storing nodes in a $d^{th}$ layer of the current search tree, specific steps of the variable depth search strategy are as follows:

(b1) initialization, setting values of L, $n_1$, and $n_2$; setting d=0, deleting all elements in the list NodeList(d), and setting $x_{new}$ as a root node;

(b2) performing neighborhood search for the root node, setting d=d+1 and selecting $n_1$ assignment schemes with smallest objective function values from the searching neighborhood of the root node as nodes in the $d^{th}$ layer;

(b3) performing a neighborhood search for each node of the $d^{th}$ layer, selecting $n_2$ assignment schemes with smallest objective function values from searching neighborhoods of each node in the $d^{th}$ layer and adding them into the NodeList(d+1);

(b4) when searching neighborhoods of all nodes in the $d^{th}$ layer are searched, there are totally $n_1 \times n_2$ nodes in list NodeList(d+1), selecting $n_1$ assignment schemes with smallest objective function values from NodeList(d+1) as nodes in a $d+1^{th}$ layer;

(b5) setting d=d+1, and if d<N, carrying out step (b3); otherwise, terminating the variable depth search strategy, and selecting a node with smallest objective function value from nodes involved in the mixed scatter search algorithm, denoting it as x'.

10. The method according to claim 1, wherein updating the reference set Refset involved in the step S409 is performed by a method of:

recording all improved assignment schemes obtained in the mixed scatter search algorithm, updating the reference set Refset when the assignment scheme subset is empty;

for each improved assignment scheme, checking if an objective function value of the improved assignment scheme is smaller than a maximum one of the objective function values of all assignment schemes in the reference set; when the objective function value of the improved assignment scheme is smaller than the maximum one of the objective function values of all assignment schemes in the reference set, replacing the assignment scheme with the maximum objective function value in the reference set with said improved assignment scheme, and when the objective function value of the improved assignment scheme is not smaller than the maximum one of the objective function values of all assignment schemes in the reference set, checking an updating of the next improved scheme.

* * * * *